(12) United States Patent
Maguire

(10) Patent No.: US 9,648,527 B2
(45) Date of Patent: May 9, 2017

(54) METHOD AND APPARATUS FOR SELECTING A CELL OF A COMMUNICATIONS NETWORK

(71) Applicant: Telefonaktiebolaget L M Ericsson (publ), Stockholm (SE)

(72) Inventor: Patrick Maguire, Athlone (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/774,183

(22) PCT Filed: Mar. 14, 2013

(86) PCT No.: PCT/EP2013/055261
§ 371 (c)(1),
(2) Date: Sep. 10, 2015

(87) PCT Pub. No.: WO2014/139576
PCT Pub. Date: Sep. 18, 2014

(65) Prior Publication Data
US 2016/0044556 A1    Feb. 11, 2016

(51) Int. Cl.
*H04Q 7/00*   (2006.01)
*H04W 36/00*  (2009.01)
(Continued)

(52) U.S. Cl.
CPC ....... *H04W 36/0094* (2013.01); *H04W 36/04* (2013.01); *H04W 36/30* (2013.01);
(Continued)

(58) Field of Classification Search
CPC ............. H04W 36/0094; H04W 36/04; H04W 52/365; H04W 36/30; H04W 40/08; H04W 48/20
(Continued)

(56) References Cited

U.S. PATENT DOCUMENTS

2008/0310306 A1* 12/2008 Dropps ................. H04L 49/25
                                                       370/235
2011/0047011 A1   2/2011 Tirpak
(Continued)

FOREIGN PATENT DOCUMENTS

EP        2 337 404 A1    12/2009
WO    WO 2010/078589 A2    7/2010

OTHER PUBLICATIONS

PCT International Search Report for International application No. PCT/EP2013/055261, Dec. 16, 2013.
(Continued)

*Primary Examiner* — Chuong T Ho
(74) *Attorney, Agent, or Firm* — Baker Botts, LLP

(57) ABSTRACT

A cell for communication with a user equipment within a mobile communications network in which the network comprises a plurality of cells, is selected by identifying (201) cells having the required signal strength for communication with a user equipment; grouping (203) the identified cells according to maximum transmit power level a user equipment may use when communicating within that cell, p-Max, each group being allocated a priority level such that the group having the lowest p-Max is allocated the highest priority level through to the group having the highest p-Max allocated the lowest priority level; and selecting (205) one of the grouped cells for communication with the user equipment from the group of cells having the highest priority level.

6 Claims, 8 Drawing Sheets

(51) Int. Cl.
*H04W 48/20* (2009.01)
*H04W 40/08* (2009.01)
*H04W 36/04* (2009.01)
*H04W 36/30* (2009.01)
*H04W 52/36* (2009.01)

(52) U.S. Cl.
CPC .......... *H04W 40/08* (2013.01); *H04W 48/20* (2013.01); *H04W 52/365* (2013.01); *Y02B 60/50* (2013.01)

(58) Field of Classification Search
USPC ................................ 370/332, 331, 330, 329
See application file for complete search history.

(56) References Cited

U.S. PATENT DOCUMENTS

| | | | |
|---|---|---|---|
| 2011/0237288 A1 | 9/2011 | Ratasuk et al. | |
| 2012/0040696 A1* | 2/2012 | Siomina | G01S 5/0036 455/456.6 |
| 2013/0095879 A1* | 4/2013 | Gupta | H04W 76/027 455/525 |
| 2013/0252622 A1* | 9/2013 | Kobayashi | H04W 72/06 455/450 |

OTHER PUBLICATIONS

3GPP TS 25.304 V6.8.0; Technical Specification; 3rd Generation Partnership Project; Technical Specification Group Radio Access Network; User Equipment (UE) procedures in idle mode and procedures for cell reselection in connected mode (Release 6), Dec. 2005.
ETSI TS 136 101 V11.2.0; Technical Specification; LTE; Evolved Universal Terrestrial Radio Access (E-UTRA); User Equipment (UE) radio transmission and reception (3GPP TS 36.1.1 version 11.2.0 Release 11), Nov. 2012.
3GPP TS 36.304 V11.1.0; 3rd Generation Partnership Project; Technical Specification Group Radio Access Network; Evolved Universal Terrestrial Radio Access (E-UTRA); User Equipment (UE) procedures in idle mode (Release 11), Sep. 2012.
3GPP TS 36.331 V11.1.0; Technical Specification; 3rd Generation Partnership Project; Technical Specification Group Radio Access Network; Evolved Universal Terrestrial Radio Access (E-UTRA); Radio Resource Control (RRC); Protocol specification (Release 11), Sep. 2012.
3GPP TS 36.304 V11.2.0; Technical Specification; 3rd Generation Partnership Project; Technical Specification Group Radio Access Network; Evolved Universal Terrestrial Radio Access (E-UTRA); User Equipment (UE) procedures in idle mode (Release 11), Dec. 2012.
3GPP TS 43.022 V11.0.0; Technical Specification; 3rd Generation Partnership Project; Technical Specification Group GSM/EDGE Radio Access Network; Functions related to Mobile Station (MS) in idle mode and group receive mode (Release 11), Sep. 2012.
LTE; Evolved Universal Terrestrial Radio Access (E-UTRA); UER Equipment (UE) Radio Transmission and Reception (3GPP TS 36.101 version 11.2.0 Release 11); ETSI TS 136 101 v11.2.0—Nov. 2012.

* cited by examiner

METHOD AND APPARATUS FOR SELECTING A CELL OF A COMMUNICATIONS NETWORK

PRIORITY

This nonprovisional application is a U.S. National Stage Filing under 35 U.S.C. §371 of International Patent Application Serial No. PCT/EP2013/055261, filed Mar. 14, 2013, and entitled "A Method and Apparatus For Selecting a Cell of a Communications Network."

TECHNICAL FIELD

The present invention relates to a method and apparatus for selecting a cell of a communications network. In particular, but not exclusively, it relates to reselection of cells for communication to provide energy savings in macro-small cell deployments.

BACKGROUND

Traditionally, mobile communications networks are arranged in a homogeneous structure, with the network comprising base stations (also known as Node Bs) arranged in a planned layout in which all base stations have similar transmit power levels, antenna patterns, receiver noise floors, and similar backhaul connectivity to the data network. Moreover, all base stations offer unrestricted access to consumer mobile devices (also known as User Equipments—UEs) in the network, and serve roughly the same number of mobile devices. Current wireless systems falling under this category include, for example, GSM, WCDMA, HSDPA, LTE and WiMAX.

More recently, heterogeneous mobile communications network structures have been considered. Heterogeneous networks are an efficient network deployment solution for satisfying the ever-increasing demand of mobile broadband services. In a heterogeneous network, a low- or lower-power node (LPN), small cell, for example a picocell, microcell or femtocell base station (NodeB), is placed in a traffic hot spot or coverage hole within the coverage area of a high- or higher-power node, for example a macrocell base station, to better serve nearby user equipments. Deploying a low power node in a traffic hot spot may significantly reduce the load in the macro or other higher-power cell covering the area.

FIG. 1 shows an exemplary heterogeneous UMTS mobile communication network 100 that comprises a macrocell node/base station (NodeB) 101 that establishes a cell with a coverage area (or cell) 103. Two low power nodes/base stations 105, 107 (for example microcell base stations) are located within the coverage area 103 of the macrocell node 101, each defining a respective coverage area 109, 111.

A user equipment 113 is shown in the cell 109 of low power node 105 and the cell 103 of the macrocell base station 101.

With increasing demand for such networks, power consumption is of increasing concern, with greater demands on reducing the power consumption of such networks whilst increasing the capacity.

Small cell and macrocell energy efficiency varies depending upon the population density and the number of subscribers. In most cases, small cells require significantly less power than macro cells on a kwh/Minute of Use (MOU) comparison.

As a rule of thumb, the smaller the cell the more power efficient it is on a per user basis. The average macrocell will utilize around 1000 W of energy to serve a maximum of around 120 simultaneous users and is more power efficient in heavily populated areas compared to sparsely populated rural areas. In comparison, a home femtocell typically and more efficiently requires 20 mW of power and accommodates between 4-8 users, and an enterprise femtocell will require 200 mW of power for 60 simultaneous users.

Indoor small cells are able to run on a lower transmit power compared to macrocells because the radio signal originates within a matter of feet from the user equipment. In addition, the user and the equipment are both indoors, so the RF signal does not need to use excess energy to penetrate through the outer wall and saves additional RF power consumption. Small cells use less RF power per user than macrocells in an mW of RF power per user comparison.

Within such networks, user equipment will select a cell (camp on a cell) which is most suitable to enable communication. For mobile equipment, the user equipment 18 may perform soft handovers from one small (low power) cell 109,111 (small cell) to a macrocell 103 or another of the small cells 109,111. The selection of a suitable cell is based on satisfying criteria which is defined for GERAN A/Gb mode or GERAN Iu mode in 3GPP TS 43.022 3GPP TS 43.022 for the GSM/EDGE radio access technology, for Universal mobile telecommunications system Terrestrial Radio Access Network (UTRAN) in 3GPP TS 25.304 3GPP TS 25.304 for the Universal Mobile Telecommunications System (UMTS) radio access technology and for E-UTRAN in 3GPP TS 36.304 3GPP TS 36.304 for the Evolved UTRAN (E-UTRAN) radio access technology.

$P_{EMAX}$ (or p-Max) is a key parameter in all cell selection processes. It represents the Maximum transmit power level a UE may use when transmitting on the uplink in the cell (dBm) defined as $P_{EMAX}$ (or p-Max) in 3GPP TS 36.301.

The operator determines the maximum cell radius by limiting the maximum TX power level, a UE can use (p-Max).

Initial Cell Selection process and possible transitions thereafter are detailed in 3GPP TS 36.304 for the E-UTRAN radio access technology.

When a UE is camped normally in RRC_IDLE mode, the UE performs the following tasks: select and monitor the indicated Paging Channels of the cell according to information sent in system information; monitor relevant System Information (SI); perform necessary measurements for the cell reselection evaluation procedure; execute the cell reselection evaluation process on the following occasions/triggers: 1) UE internal triggers, so as to meet various performance requirements; 2) When information on the BroadCast CHannel (BCCH) used for the cell reselection evaluation procedure has been modified.

The UE monitors the Paging CHannel (PCH) to receive System Information change notifications in RRC_IDLE. Changes in the system information are indicated by the network using a Paging message. When the Paging message indicates system information changes then UE shall re-acquire all system information as specified in 3GPP TS 36.331.

When the existing cell reselection evaluation process is triggered, measurements are initiated on candidate cells based on defined cell reselection priority rules as indicated in System Information 3GPP TS 36.304 for the E-UTRAN radio access technology.

Assuming measurements are initiated, measurement data is collected and the following cell selection criteria is applied;

The cell selection criterion S is fulfilled when:

$Srxlev > 0$ AND $Squal > 0$ where $Srxlev = Q_{rxlevmeas} - (Q_{rxlevmin} + Q_{rxlevminoffset}) - Pcompensation$ $Squal = Q_{qualmeas} - (Q_{qualmin} + Q_{qualminoffset})$ where:

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority Public Land Mobile Networks (PLMN) while camped normally in a Virtual PLMN (VPLMN) GPP TS 43.022 for the GSM/EDGE radio access technology |
| $Q_{qualminoffset}$ | Offset to the signalled $Q_{qualmin}$ taken into account in the Squal evaluation as a result of a periodic search for a higher priority PLMN while camped normally in a VPLMN 3GPP TS 43.022 for the GSM/EDGE radio access technology |
| Pcompensation | max(p-Max − $P_{PowerClass}$, 0) (dB) |
| $P_{EMAX}$ | Maximum TX power level an UE may use when transmitting on the uplink in the cell (dBm) defined as p-Max in [TS 36.101] |
| $P_{PowerClass}$ | Maximum RF output power of the UE (dBm) according to the UE power class as defined in [TS 36.101] |

The signaled values $Q_{rxlevminoffset}$ and $Q_{qualminoffset}$ are only applied when a cell is evaluated for cell selection as a result of a periodic search for a higher priority PLMN while camped normally in a VPLMN 3GPP TS 43.022 for the GSM/EDGE radio access technology. During this periodic search for higher priority PLMN the UE may check the S criteria of a cell using parameter values stored from a different cell of this higher priority PLMN.

The cell reselection evaluation process does not differentiate between cell type (macro, micro, pico, etc.). As the cell selection process hinges on signal strength srxlev and fact the small cells will have lower srxlev compared to macro cells, even though there are suitable small cells, the UE will always select a suitable macro cell. This is poor use of the power gains which can be achieved if a suitable small cell is not given higher priority than a suitable macro cell in a macro-small cell network.

SUMMARY

The present invention seeks to provide a technique for maintaining the capacity of a communications network whilst reducing power consumption.

This is achieved, according to one aspect of the present invention, by a method of selecting a cell for communication with a user equipment within a mobile communications network. The network comprises a plurality of cells. Firstly, cells having the required signal strength for communication with a user equipment are identified. The identified cells are then grouped according to maximum transmit power level a user equipment may use when communicating within that cell, p-Max. Each group is allocated a priority level such that the group having the lowest p-Max is allocated the highest priority level through to the group having the highest p-Max allocated the lowest priority level; One of the grouped cells is then selected for communication with the user equipment from the group of cells having the highest priority level.

As a result, cells can be selected by taking into account the type of cell. This is achieved by assigning a higher priority level to small cells over macro cells assuming both are suitable cells in the cell reselection process. Therefore, smaller cells are selected over larger cells, thus minimising the power consumption. The cell type (macro, micro, pico, femto) is based on the Maximum TX power level a UE may use when accessing the cell (p-Max) is used as an input in cell reselection process to take advantage of power gains available in small cell deployments.

In an embodiment, the method further comprises the step of: reallocating a priority level to each group of cells based on the congestion of each group of cells.

The method may further comprise the steps of: tracking the number of handovers from one group of cells to another; determining the congestion of each group from the tracked handovers.

The priority levels may be allocated such that a group of highest p-Max having congestion below a predetermined threshold has the lowest priority level.

Therefore, the priority levels can be used to increase flexibility in reselection, enabling other factors to be taken into account such as congestion.

The step of selecting one of the grouped cells may comprise the step of: selecting the cell having the strongest signal at the location of the user equipment within the group of cells having the highest priority level.

The method may further comprise: reconfiguring the groups according to at least one of: cardinality, range, priorities and time.

This is achieved, according to another aspect of the present invention, by a system for selecting a cell for communication with a user equipment within a mobile communications network. The network comprises a plurality of cells. The system comprises an identifier configured to identify cells having the required signal strength for communication with a user equipment. The system further comprises a system configurator configured to group the identified cells according to maximum transmit power level a user equipment may use when communicating within that cell, p-Max. Each group is also allocated a priority level such that the group having the lowest p-Max is allocated the highest priority level through to the group having the highest p-Max allocated the lowest priority level. The system further comprises a selector configured to select one of the grouped cells for communication with the user equipment from the group of cells having the highest priority level.

The system configurator may further be configured to allocate a priority level to each group of cells based on the congestion of each group of cells.

The system may further comprise a counter configured to track the number of handovers from one group of cells to another; and the system configurator is further configured to determine the congestion of each group from the tracked handovers.

The system configurator may further be configured to reconfigure the groups according to at least one of: cardinality, range, priorities and time.

This is achieved, according to another aspect of the present invention, by a method of operating a network controller node in a mobile communications network when one or more user equipments are located in cells of a plurality of nodes of the network. Information relating to the congestion of each of the cells is received. Each controller node, manual or automatic selection of cells is enabled. If manual selection enabled, reconfiguring groups of cells that have been grouped according to maximum transmit power level a user equipment may use when communicating within that cell, p-Max, are reconfigured. Priority levels are allocated to the groups based on the received information relating to the congestion of each of the cells. Information relating to each reconfiguration is then transmitted to one or more nodes to cause the nodes to broadcast the transmitted information and/or an information change notification to one or more user equipments.

In an embodiment the method of operating a network controller node further comprises:

storing the received information relating to the congestion of each of the cells, and allocating the priority levels to each group based on the stored received information.

This is achieved, according to another aspect of the present invention, by a controller node for use in a mobile communications network when one or more user equipments are located in cells of a plurality of nodes of the network. The controller node comprises a receiver configured to receive information relating to congestion of each of the cells. The controller node further comprises a system configurator configured, if manual selection enabled, to reconfigure groups of cells that have been grouped according to maximum transmit power level a user equipment may use when communicating within that cell, p-Max, and to allocate priority levels to the groups based on the received information relating to the congestion of each of the cells. The controller node further comprises a transmitter configured to transmit information relating to each reconfiguration to one or more nodes to cause the nodes to broadcast the transmitted information and/or an information change notification to one or more user equipments.

The controller node may further comprise a storage device configured to store the received information relating to congestion of each group of cells and wherein the system configurator is further configured to allocate priority levels to the groups based on the stored information relating to congestion.

This is achieved, according to another aspect of the present invention, by a method of operating a node of a cell of a mobile communications network, the node capable of communication with a plurality of user equipments. If automatic selection enabled, groups of cells, that have been grouped according to maximum transmit power level a user equipment may use when communicating within that cell, p-Max, are reconfigured and priority levels are allocated to the groups. Information relating to the reconfiguration of the groups is broadcast to one or more user equipments upon reconfiguration of the groups. If manual selection is enabled, information relating to reconfigured groups of cells, grouped according to maximum transmit power level a user equipment may use when communicating within that cell, p-Max and information relating to priority levels allocated to the groups is received. The received information relating to the reconfiguration of the groups is broadcast to one or more user equipments in response to receipt of information relating to reconfigured groups.

In an embodiment, the method further comprises the step of: tracking the number of handovers from one group to another; determining the congestion of each group of cells from the tracked handovers, and wherein a priority level is allocated to each group of cells based on the determined congestion of each group of cells. The method may further comprise reconfiguring system information, SI, parameters upon reconfiguration of the groups; broadcasting reconfigured SI parameters to one or more user equipment; and broadcasting system information change notification to one or more user equipments upon reconfiguration of the SI parameters.

This is achieved, according to another aspect of the present invention, by a node of a cell of a mobile communications network. The node is capable of communication with a plurality of user equipments. The node comprises a receiver configured to receive information relating to reconfigured groups of cells within a mobile communication network, the cells having been grouped according to maximum transmit power level a user equipment may use when communicating within that cell, p-Max, and information relating to priority levels allocated to the groups. The node further comprises a system configurator configured, if an automatic selection is enabled, to reconfigure the groups of cells that have been grouped according to maximum transmit power level a user equipment may use when communicating within that cell, p-Max, and to allocate priority levels to the groups. The node further comprises a broadcaster configured to broadcast information relating to the reconfiguration of the groups to one or more user equipments in response to receipt of information relating to reconfigured groups, if a manual selection is enabled, or in response to reconfiguration of the groups by the system configurator, if an automatic selection is enabled.

The node may further comprise a counter configured to track the number of handovers from one group to another; and a transmitter configured to transmit information relating to the tracked number of handovers to a controller node.

The system configurator may further be configured, if an automatic selection is enabled, to allocate priority levels to the groups based on the tracked number of handovers.

The system configurator may be further configured to reconfigure system information, SI, parameters upon reconfiguration of the groups.

The broadcaster may be further configured to broadcast reconfigured SI parameters and a SI change notification to one or more user equipments.

This is achieved, according to another aspect of the present invention, by a method of operating a user equipment in a mobile communications network. The network comprises a plurality of cells, each cell comprising a node capable of communication with a plurality of user equipments. The user equipment receives a system information change notification; upon receipt of a system information change notification, it reselects a cell for communication by: identifying cells having the required signal strength for communication with a user equipment; grouping the identified cells according to maximum transmit power level a user equipment may use when communicating within that cell, p-Max, each group being allocated a priority level such that the group having the lowest p-Max is allocated the highest priority level through to the group having the highest p-Max allocated the lowest priority level; and selecting one of the grouped cells for communication with the user equipment from the group of cells having the highest priority level.

In an embodiment, the method further comprises receiving broadcast system information, the system information including information relating to the configuration of the groups of cells and storing the broadcast system information.

This is achieved, according to another aspect of the present invention, by a user equipment for use in a mobile communications network. The network comprises a plurality of cells. Each cell comprises a node capable of communication with a plurality of user equipments. The user equipment comprises a receiver configured to receive a system information change notification. It also comprises a control unit configured, upon receipt of a system information change notification, to reselect a cell for communication by: identifying cells having the required signal strength for communication with a user equipment; grouping the identified cells according to maximum transmit power level the user equipment may use when communicating within that cell, p-Max, each group being allocated a priority level such that the group having the lowest p-Max is allocated the highest priority level through to the group having the highest p-Max allocated the lowest priority level; and selecting one of the grouped cells for communication with the user equipment from the group of cells having the lower p-Max and the highest priority level.

The user equipment may further comprise a receiver configured to receiving broadcast system information, the system information including information relating to the configuration of the groups of cells; and a storage element configured to store the broadcast system information.

The control unit may be further configured to select the cell having the strongest signal within the group of cells having the highest priority level.

BRIEF DESCRIPTION OF DRAWINGS

For a more complete understanding of the present invention, reference is now made to the following description taken in conjunction with the accompanying drawings in which:

FIG. 4b is a flowchart of a method of operating the controller node of FIG. 4a;

FIG. 5b is a flowchart of a method of operating the node of FIG. 5a;

FIG. 6b is a flowchart of a method of operating the user equipment of FIG. 6a.

DETAILED DESCRIPTION

While this invention is applicable to other radio access technologies, only the E-UTRAN (LTE) scenario is described herein.

Figure 1:
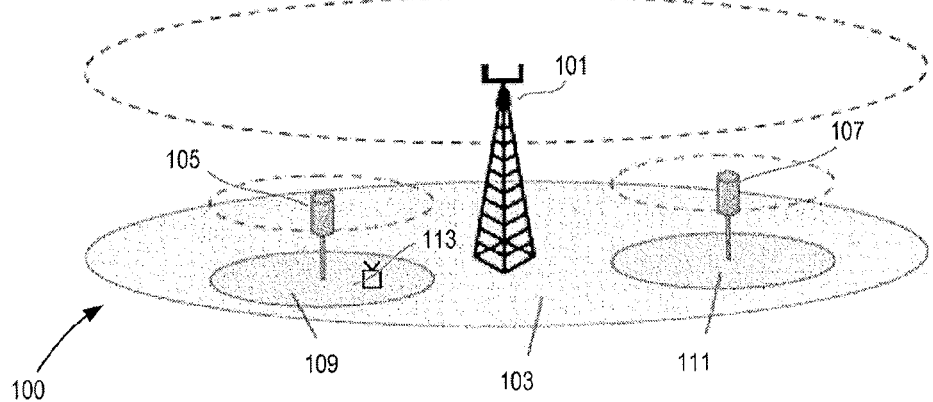
FIG. 1 is an illustration of a mobile communications network.
Figure 2:
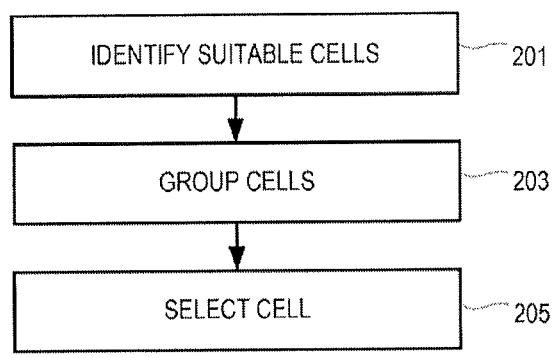
FIG. 2 is a flowchart of a method of selecting a cell for communication according an embodiment of the present invention.

With reference to FIG. 2, according to an embodiment, a cell 103, 109, 111 for communication with a user equipment 113 within a mobile communications network 100 is selected by first identifying 201 cells having the required signal strength for communication with a user equipment 113. Preferably all cells having the required signal strength for communication with a user equipment 113 are identified. The identified cells are then grouped, 203, according to p-Max. P-Max is the maximum transmit power level a user equipment may use when communicating within that cell.

Figure 3:
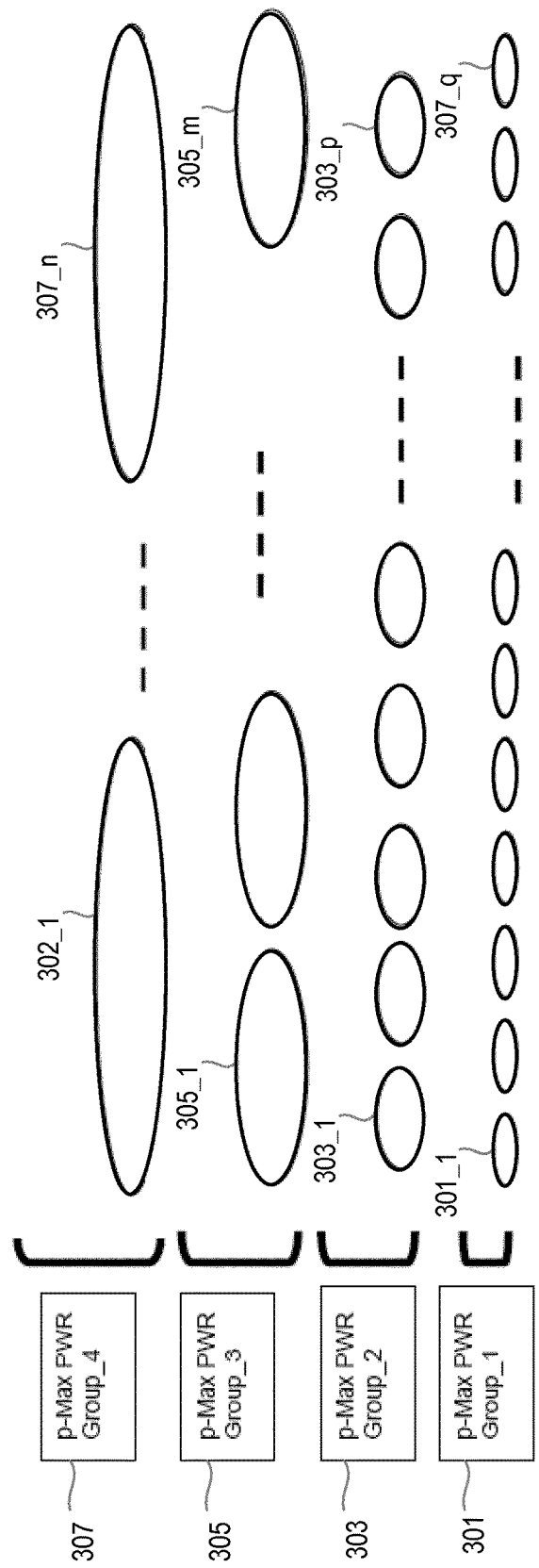
FIG. 3 is an example of group of cells.

An example of the groupings of the cell is illustrated in FIG. 3. In this example 4 p-Max groups 301, 303, 305, 307 have been utilised. This number of groups is for illustrative purposes only and it can be appreciated that any number of groups may be defined. Each group is defined by a range of p-Max values, for example, power ranges as specified in the specification TS 36.101. Each cell is then assigned to a particular group depending on the p-Max value for that cell. The first group 301 includes identified cells 301_1 to 301_q. The second group 303 includes identified cells 303_1 to 303_p. The third group 305 includes identified cells 305_1 to 305_m and the fourth group 307 includes the identified cells 307_1 to 307_n. For this example, the first group 301 includes cells having the lowest p-Max, for example femto cells. The second group 303 includes cells of the next subsequent range of p-max values to those of the first group 301, for example pico cells. The third group 305 includes cells of the next subsequent range of p-max values to those of the second group 303, for example micro cells. The fourth group 307 includes cells having the highest p-Max values, for example macro cells. Each group is allocated a priority level such that the first group 301 is allocated the highest priority level, the second group is allocated the next subsequent priority level from the highest, the third group is allocated the next subsequent priority level and the fourth group 307 is allocated the lowest priority level. Next, one of the cells is selected, 205, from the group having the highest priority level. In the example of FIG. 3, a cell from the group 301 is selected, i.e. a cell from the group having the lowest p-Max.

The priority levels allocated to each group may be reallocated depending on the congestion within each cell.

Figure 5A:
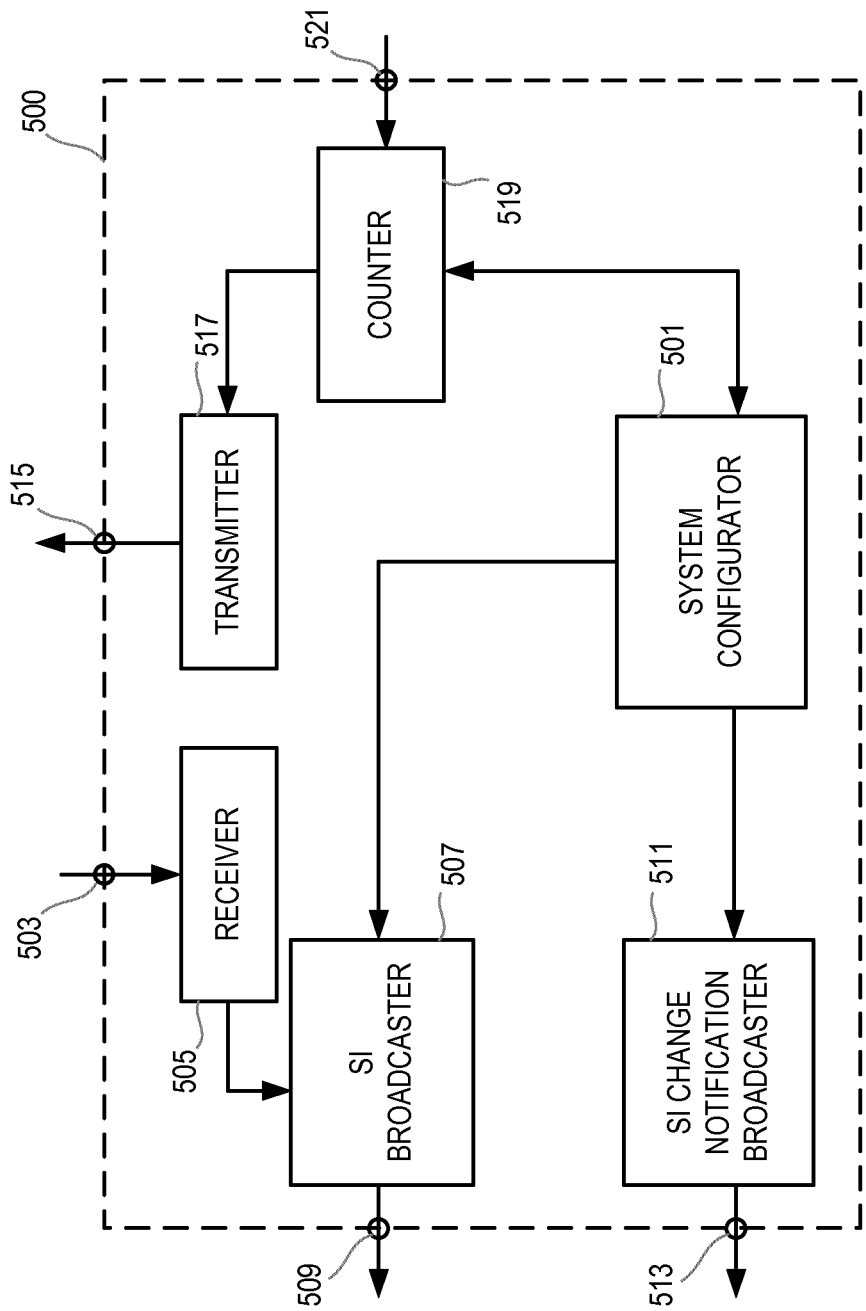
FIG. 5a is a simplified schematic of a node according an embodiment of the present invention.

A PM counter is provided as illustrated in FIG. 5a to track the number of handovers executed from one power group to a higher power group due to radio congestion.

For example if handover statistics for an analysis period, for example, 1 hour or a longer period if the number of handovers is fairly stable of the arrangement shown in FIG. 3 may be as follows:

% of total handover due to radio congestion from the first group 301 to the second group 303 is 70%

% of total handover due to radio congestion from the first group 301 to the third group 305 is 7%

% of total handover due to radio congestion from the first group 301 to the fourth group 307 is 3%

% of total handover due to radio congestion from the second group 303 to the third group 305 is 15%

% of total handover due to radio congestion from the second group 303 to the fourth group is 8%

% of total handover due to radio congestion from the third group 305 to fourth group 307 is 7%

As a result of tracking the amount of handovers between groups, the first group 301 is clearly heavily congested. Therefore, the priority level (the highest) for the first group 301 is reallocated so that it is reduced so as to reduce the volumes of UE's camping on the network as this power level. For example, the first group 301 may be allocated the current priority level allocated to the second group 303 and the second group is reallocated the priority level of the first group 301. As a result selection is made from the cells of the second group 303 as this now has the highest priority level. The priority assignment per power group supports additional flexibility.

Figure 4A:
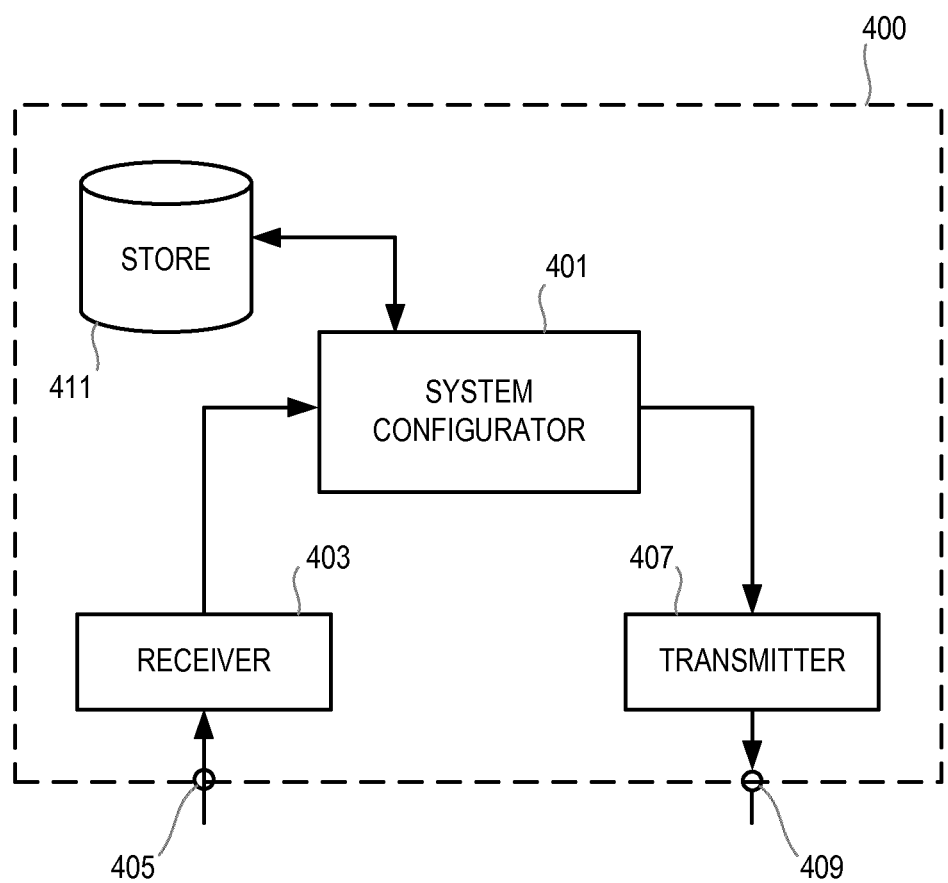
FIG. 4a is a simplified schematic of a controller node according an embodiment of the present invention.

FIG. 4a is an embodiment of a controller node 400. The controller node is in communication with each of the nodes 101, 105, 107 to control the nodes 101, 105, 107 and manage radio resources and mobility in the cell of each node. The controller node 400 may connect directly to the macrocell node 101, and connect via the Internet to the low power nodes 103, 105. In addition, the controller node 400 comprises a receiver 403 having an input connected to an input terminal 405. The output of the receiver 403 is connected to a system configurator 401. The system configurator 401 is also connected to a transmitter 407. The output of the transmitter 407 is connected to an output terminal 409 of the controller node 400. A storage device 411 is connected to the system configurator 401.

Figure 4B:
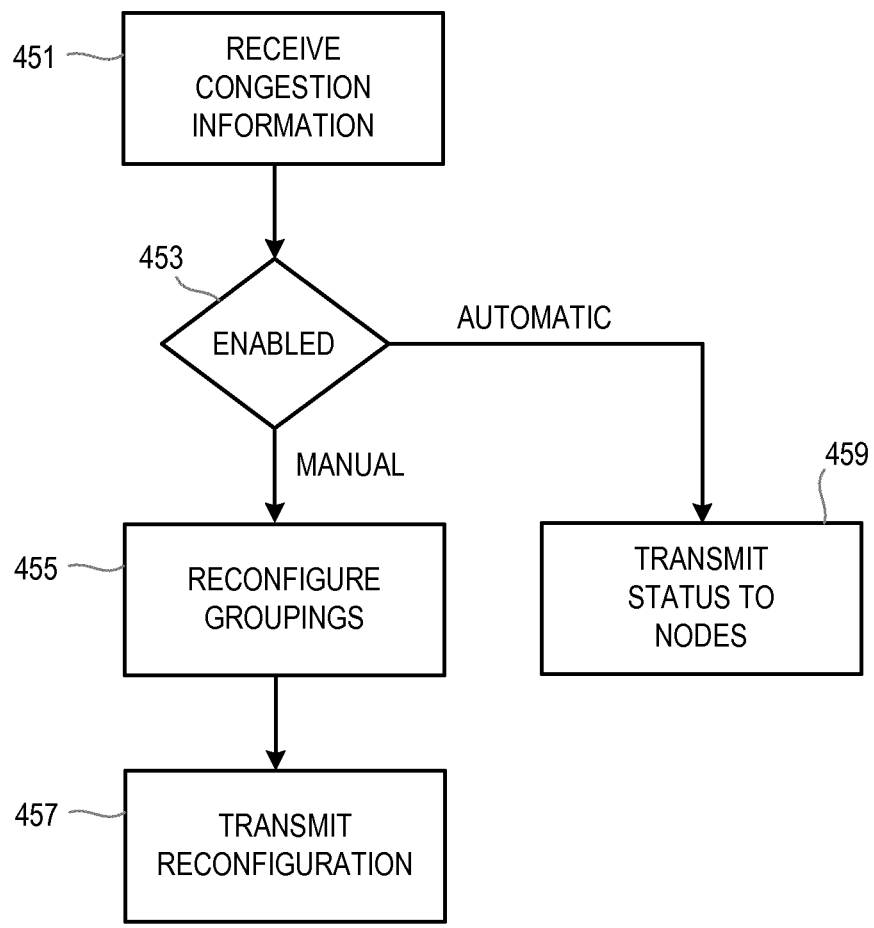

Operation of the network controller node 400 according to an embodiment will now be described with reference to FIG. 4b. Information relating to the congestion of each cell is received, 451, on the input terminal 405 by the receiver 403 from each node of each cell connected to (in communication with) the controller node 400. The system configurator 401 may be enabled to operate in a manual mode (manual selection of cells) or an automatic mode (automatic selection of cells). If manual mode of operation (manual selection) is enabled, 453, the system configurator 401 reconfigures, 455 the groups of cells, for example, the groups 301, 303, 305, 307 of FIG. 3. The groups may be reconfigured according to cardinality, range, priorities and time, for example, to reconfigure the number of groups, the range of each group to minimise handovers between groups. As described above, the system configurator 401 further allocates and reallocates priority levels to the groups based on the received information relating to the congestion of each cell. Information relating to reconfiguration is transmitted, 457, by the transmitter 407 on the output terminal 409 to one or more nodes 101, 103, 105 to cause the nodes to broadcast the transmitted information and/or an information change notification to one or more user equipments.

The storage device 411 of the controller node 400 stores historical data of Performance Monitoring (PM) counters of the node (shown in FIG. 5a) so if in the event that automatic selection is enabled, the controller node 400 reconfigures the groups on the basis of the stored data of tracked handovers, i.e. congestion to determine the number of groups, the range of each group and priority levels allocated to each group in order to minimise the number of handovers between groups.

FIG. 5a illustrates an embodiment of a node 500 of a cell of a mobile communications network. The node 500 is capable of communication with a plurality of user equipments. The node comprises a system configurator 501 connected to a counter 519, for example a PM counter, an SI broadcaster 507 and an SI change notification broadcaster 511. The counter 519 receives inputs via the second input terminal 521 and outputs to a transmitter 517. The transmitter 517 is connected to a third output terminal 515. The SI broadcaster 507 is connected to a receiver 505 which receives inputs via the first input terminal 503. The output of the SI broadcaster 507 is connected to a first output terminal 509. The SI change notification broadcaster 511 outputs to a second output terminal 513. The SI broadcaster and the SI change notification broadcaster may be integrated providing output on the same output terminal and hence the same broadcast channel. The system configurator 501 is connected to a third input terminal 523. The third input terminal 523 is in communication with the output terminal 409 of the controller node 400. The third output terminal 515 is in communication with the input terminal 405 of the controller node 400.

Figure 5B:
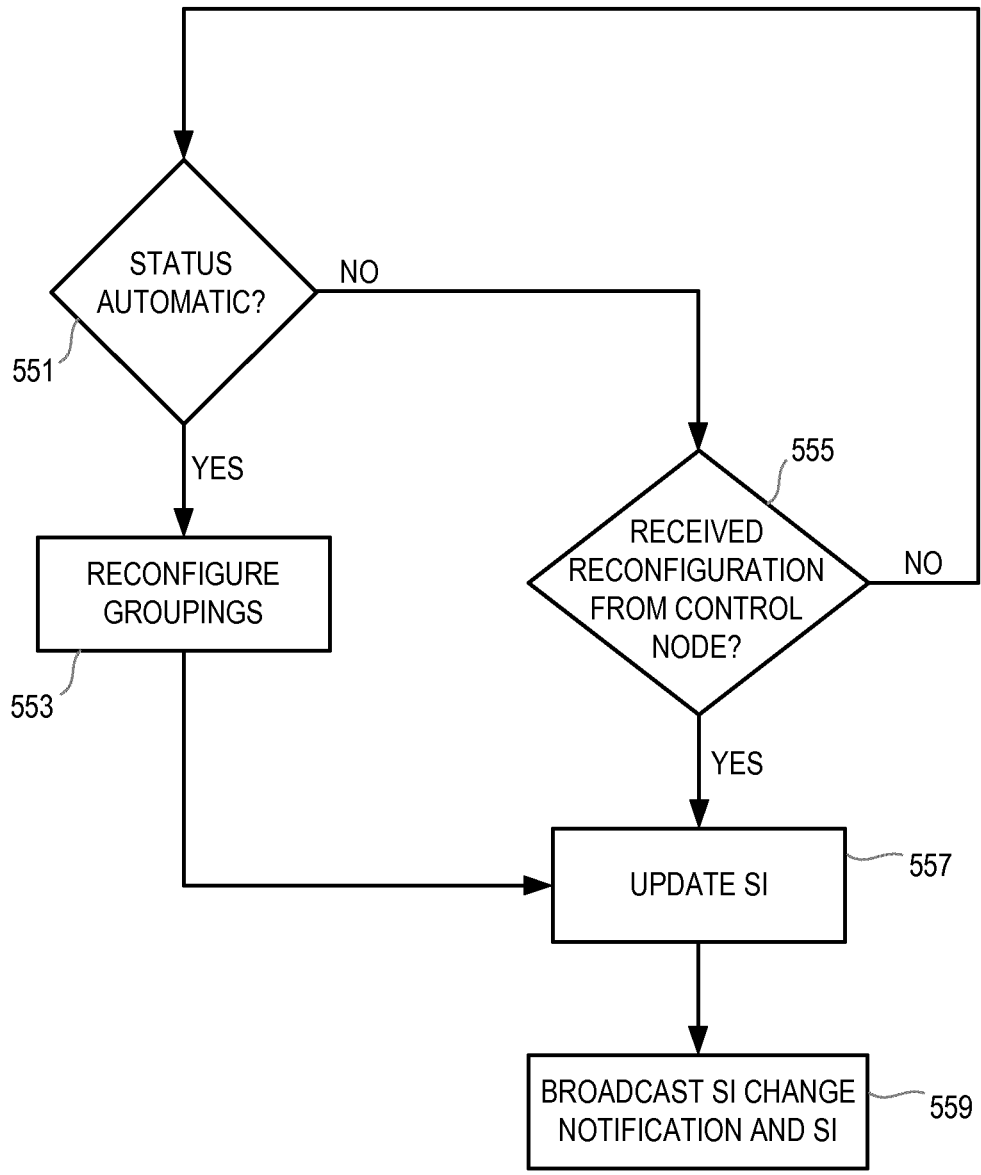

Operation of the node 500 will be described with reference to FIG. 5b. First it is established if the controller node 400 has enabled automatic selection or manual selection, 551.

If automatic selection is enabled, the groups of cells 301, 303, 305, 307 are reconfigured, 553, by the system configurator 501 of each node 500. Reconfiguration of the groups may include reallocation of priority levels based on the congestion data tracked by the counter 519. This data is also transmitted via the transmitter 517 and the third output terminal 515. The system information parameters are then updated, 557 by the system configuration 501. A system information (SI) change notification and the new SI parameters (which includes information relating to the reconfiguration of the groups) is broadcast, 559 to one or more user equipments upon reconfiguration of the groups by the SI broadcaster 507 and the first output terminal 509 and the SI change notification broadcaster 511 and the second output terminal 513.

If manual selection is enabled, each node awaits, 555, receipt of information relating to reconfigured groups from the controller node 400. Upon receipt of the information relating to reconfigured groups from the controller node 400 via the receiver 505 and the first input terminal 503, the system information parameters are updated, 557 and the system information (SI) change notification and the new SI parameters (which includes information relating to the reconfiguration of the groups) is broadcast, 559 to one or more user equipments via the respective broadcasters 507, 511. Information relating to reconfigured groups is broadcasted on SI System level in System Information Block no. 2 (SIB2) which is applicable to all UE's.

Figure 6A:
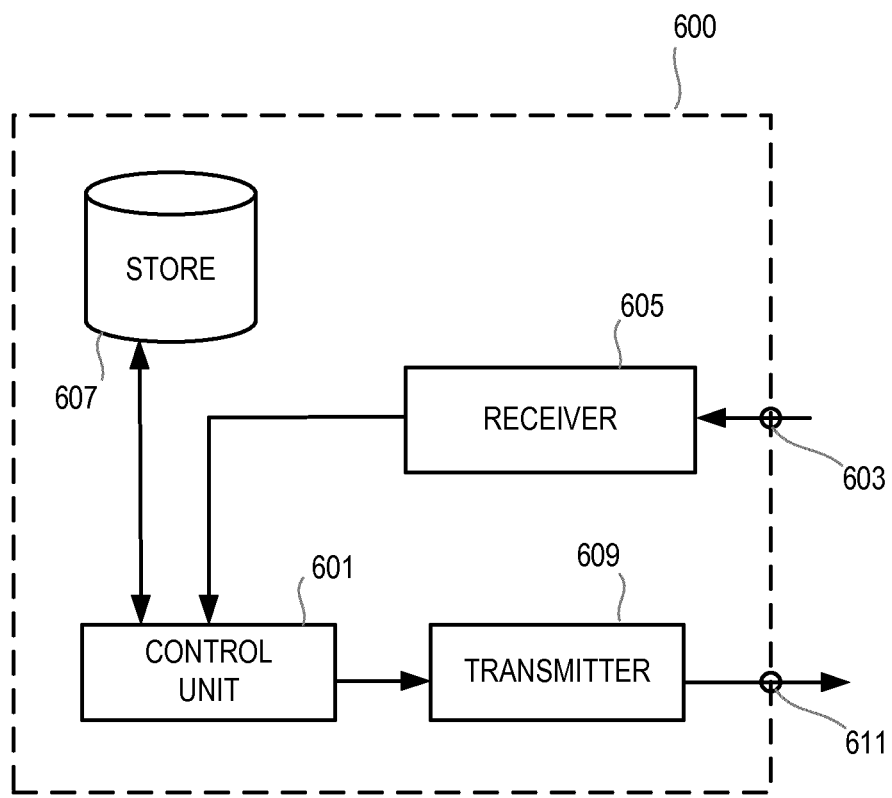
FIG. 6a is a simplified schematic of a user equipment according an embodiment of the present invention.

FIG. 6a is an embodiment of UE 600 in a mobile communications network in which the UE is capable of communication with a plurality of nodes of the network. The UE 600 comprises an input terminal 603 connected to the input of a receiver 605. It also comprises an output terminal 611 connected to the output of a transmitter 609. The receiver 605 and the transmitter 609 are connected to a control unit 601. The control unit 601 is also connected to a storage device 607. The input terminal 603 of the UE 600 is in communication with the first output terminal 509 and the second output terminal 513 of a node 500. The output terminal 611 of the UE 600 is in communication with the second input terminal 521 of the node 500.

Figure 6B:
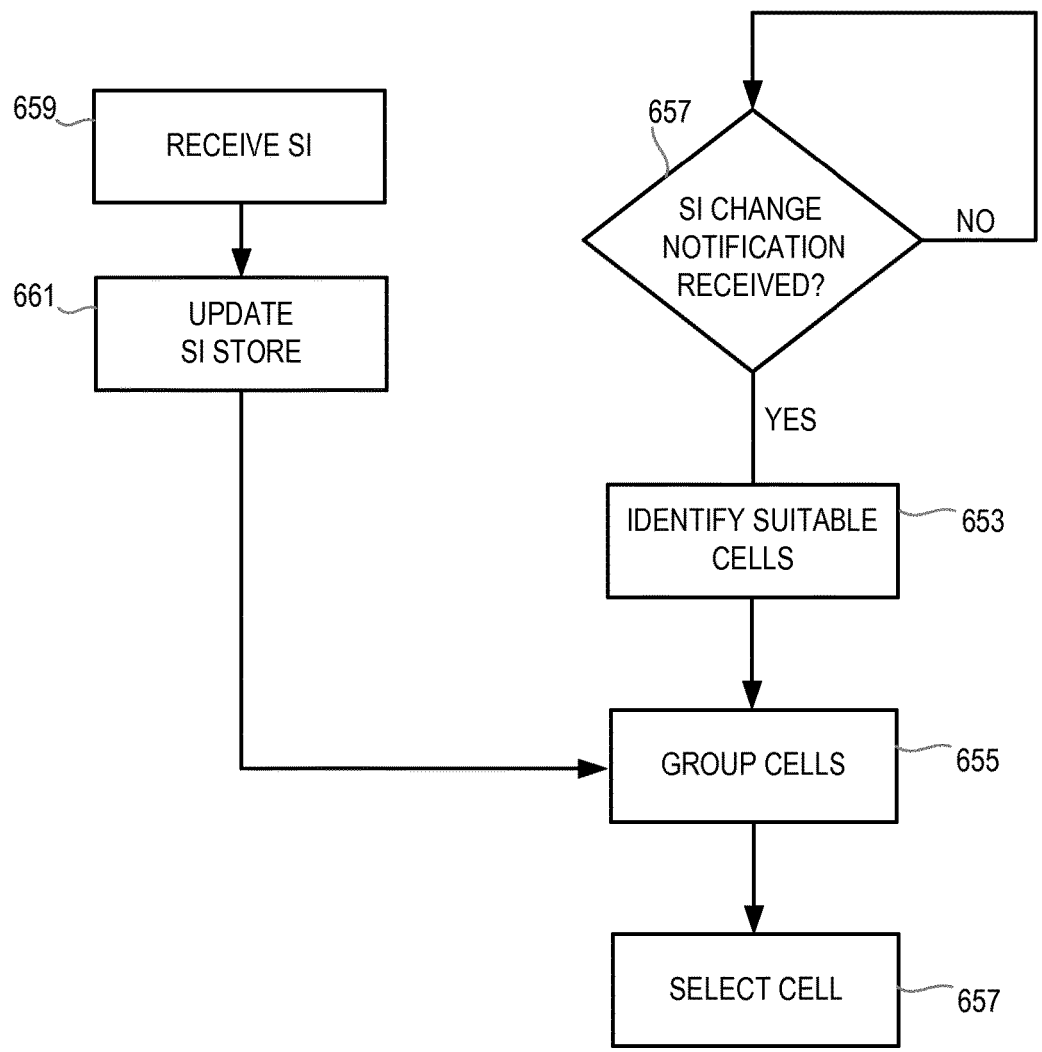

Operation of the user equipment will now be described with reference to FIG. 6b. Upon receipt, 657, of an SI change notification via existing paging messaging channels at the receiver 605, the control unit 601 identifies, 653, cells having the required signal strength for communication with the UE 600, Upon receipt, 661, of changes to SI, the SI stored in the storage device 607 is updated, 661 by the control unit 601. When UE receives the Paging message indicating System Information has changed, this will trigger the UE to execute the Cell Reselection evaluation process as shown in FIG. 2.

The grouping of the cells is then defined by the updated SI, 655 and one of the grouped cells for communication with the UE 600 is selected, 657, from the group of cells having the highest priority level.

The control unit 601 of the UE 600 selects the best cell from the selected group. This may be the cell having the highest signal strength.

In addition to enabling selection based on the cell type to reduce power consumption of the network, it also provides reduced power consumption of the UE. If every time a smartphone camps on an available 3GPP cell, it is directed to a suitable cell which places the lowest power consumption requirements on the smartphone.

It also reduces the number of required handovers due to radio congestion. Today cell selection in macro-small cell deployments closer resembles a "champagne waterfall" which in high load scenarios will result in multiple handovers and unwanted Control Plane (CP) load in the system.

Further, if a macro cell is operating at low capacity, its traffic is offloaded to neighbouring macro cells and it is powered down. Remaining powered up cells (sectors) take on its coverage.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A method of selecting a cell for communication with a user equipment within a mobile communications network, the network comprising a plurality of cells, the method comprising the steps of:
   identifying cells having the required signal strength for communication with a user equipment;
   grouping the identified cells according to maximum transmit power level a user equipment may use when communicating within that cell, p-Max, each group being allocated a priority level such that the group having the lowest p-Max is allocated the highest priority level through to the group having the highest p-Max allocated the lowest priority level;
   tracking the number of handovers from one group of cells to another;
   determining the congestion of each group from the tracked handovers;
   reallocating a priority level to each group of cells based on the congestion of each group of cells; and
   selecting one of the grouped cells for communication with the user equipment from the group of cells having the highest priority level.

2. The method according to claim 1, wherein the step of selecting one of the grouped cells comprises the step of:
   selecting the cell having the strongest signal at the location of the user equipment within the group of cells having the highest priority level.

3. A method according to claim 1, wherein the method further comprises:
   reconfiguring the groups according to at least one of: cardinality, range, priorities and time.

4. A system for selecting a cell for communication with a user equipment within a mobile communications network, the network comprising a plurality of cells, the system comprising:
   an identifier configured to identify cells having the required signal strength for communication with a user equipment;
   a counter configured to track the number of handovers from one group of cells to another;
   a system configurator configured to:
      group the identified cells according to maximum transmit power level a user equipment may use when communicating within that cell, p-Max, each group being allocated a priority level such that the group having the lowest p-Max is allocated the highest priority level through to the group having the highest p-Max allocated the lowest priority level,
      allocate a priority level to each group of cells based on the congestion of each group of cells, and
      determine the congestion of each group from the tracked handovers; and
   a selector configured to select one of the grouped cells for communication with the user equipment from the group of cells having the highest priority level.

5. A system according to claim 4, wherein the system configurator is further configured to reconfigure the groups according to at lease one of cardinality, range, priorities and time.

6. A method of operating a user equipment in a mobile communications network, the network comprising a plurality of cells, each cell comprising a node capable of communication with a plurality of user equipments, the method comprising the steps of:
   receiving a system information change notification;
   upon receipt of a system information change notification, reselecting a cell for communication by:
      identifying cells having the required signal strength for communication with a user equipment;
      grouping the identified cells according to maximum transmit power level a user equipment may use when communicating within that cell, p-Max, each group being allocated a priority level such that the group having the lowest p-Max is allocated the highest priority level through to the group having the highest p-Max allocated the lowest priority level;
      tracking the number of handovers from one group of cells to another;
      determining the congestion of each group from the tracked handovers;
      reallocating a priority level to each group of cells based on the congestion of each group of cells; and
      selecting one of the grouped cells for communication with the user equipment from the group of cells having the highest priority level.

* * * * *